United States Patent [19]

Hartman et al.

[11] Patent Number: 5,387,273
[45] Date of Patent: Feb. 7, 1995

[54] PROCESS FOR REMOVING COPPER IN A RECOVERABLE FORM FROM SOLID SCRAP METAL

[75] Inventors: Alan D. Hartman; Laurance L. Oden; Jack C. White, all of Albany, Oreg.

[73] Assignee: The United States of America as represented by the Secretary of the Interior, Washington, D.C.

[21] Appl. No.: 174,081

[22] Filed: Dec. 28, 1993

[51] Int. Cl.$^6$ ............................................. C22B 7/00
[52] U.S. Cl. ................................................... 75/401
[58] Field of Search ............................ 75/401; 423/44

[56] References Cited

U.S. PATENT DOCUMENTS 4,086,084 4/1978 Oliver ................................. 423/44

FOREIGN PATENT DOCUMENTS 354833 12/1992 Japan ..................................... 75/401

*Primary Examiner*—Melvyn J. Andrews
*Attorney, Agent, or Firm*—E. Philip Koltos

[57] ABSTRACT

A process for removing copper in a recoverable form from a copper/solid ferrous scrap metal mix is disclosed. The process begins by placing a copper/solid ferrous scrap metal mix into a reactor vessel. The atmosphere within the reactor vessel is purged with an inert gas or oxidizing while the reactor vessel is heated in the area of the copper/solid ferrous scrap metal mix to raise the temperature within the reactor vessel to a selected elevated temperature. Air is introduced into the reactor vessel and thereafter hydrogen chloride is introduced into the reactor vessel to obtain a desired air-hydrogen chloride mix. The air-hydrogen chloride mix is operable to form an oxidizing and chloridizing atmosphere which provides a protective oxide coating on the surface of the solid ferrous scrap metal in the mix and simultaneously oxidizes/chloridizes the copper in the mix to convert the copper to a copper monochloride gas for transport away from the solid ferrous scrap metal. After the copper is completely removed from the copper/solid ferrous scrap metal mix, the flows of air and hydrogen chloride are stopped and the copper monochloride gas is collected for conversion to a recoverable copper species.

4 Claims, 3 Drawing Sheets

PROCESS FOR REMOVING COPPER IN A RECOVERABLE FORM FROM SOLID SCRAP METAL

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

1. Field of the Invention The present invention relates generally to a process for removing copper from a copper/ferrous scrap metal mix and, more particularly, to such a process which employs an oxidizing and chloridizing gas atmosphere operable to coat the ferrous scrap metal with a protective oxide coating while simultaneously chloridizing the copper until the copper is removed from the mix as a gas.

2. Description of the Prior Art

As is well known in the art, ferrous scrap is an important source of iron in steel making. However, with the increased use and recycling of ferrous scrap, the overall scrap quality is steadily decreasing. This is due in large part to the buildup of tramp elements such as copper which contaminate the scrap. Electric arc furnaces presently account for approximately 40% of the steel produced domestically on an annual basis, and these furnaces use 100% scrap metal as the charge source. It is apparent that ferrous scrap contaminated with tramp elements, particularly copper, makes an extremely inefficient charge material.

Presently, there is no really satisfactory process available for economically and efficiently removing copper in a recoverable form from solid ferrous scrap metal. In an article entitled "A New Low Temperature Process For Copper Removal From Ferrous Scrap", *Iron & Steelmaker*, November 1991, Vol. 18, No. 11, pages 61 through 68, coauthors A. W. Cramb and R. J. Fruehan disclose a process for removing tramp copper from solid ferrous scrap metal. However, the disadvantages of this process are that the process is energy intensive (i.e.—it must be conducted at 1,000 degrees C. or above) and the liquid matte used to remove copper tends to stick to the scrap metal which subsequently raises the sulphur content in the steel produced. The matte held by the scrap metal is processed with a hot acid wash to reduce its level, but this involves another unit operation at elevated temperatures which diminishes the economic value of the process. In addition, the sulphide matte and liquid wash acid must be dealt with after the process is completed.

Another process for removing tramp copper from solid ferrous scrap metal is disclosed in an article by K. Tokinori, H. Ohshita and M. Iwase, entitled "Removal Of Copper From Solid Ferrous Scrap By Using Molten Aluminum", 49th *Electric Furnace Conference Proceedings*, Vol. 49, Toronto Meeting, Nov. 12-15, 1991, at pages 113 through 120. Although following this process does permit copper to be removed from solid ferrous scrap metal, it also has disadvantages. For example, this process is also energy intensive as the process is reported to work best at 750 degrees C. In addition, the user is required to handle, process and work with molten aluminum.

As seen from the foregoing, although processes have been discussed for removing copper from solid ferrous scrap metal they are not without their shortcomings. Consequently, there is a need for an improved process for removing copper from solid ferrous scrap metal which allows the ferrous scrap metal to remain metallurgically intact while the copper is removed and recovered in economical fashion. This improved process should be capable of improving the overall quality of ferrous scrap metal and subsequently the quality of steel produced with ferrous scrap metal treated via the process.

SUMMARY OF THE INVENTION

The present invention relates to a process for removing copper in a recoverable form from solid ferrous scrap metal designed to satisfy the aforementioned needs. The process of the present invention employs an oxidizing and chloridizing gas atmosphere operable to provide a protective oxide coating on the surface of iron in a copper/ferrous scrap metal mix while simultaneously chloridizing the copper within the mix until all of the copper is removed as a gas. The gas containing the copper species is allowed to cool and solidify permitting subsequent recovery of the copper.

Accordingly, the present invention is directed to a process for removing copper in a recoverable form from a copper/solid ferrous scrap metal mix. The process includes the steps of:

(a) placing a copper/solid ferrous scrap metal mix into a reactor vessel; (b) purging the atmosphere within the reactor vessel with an inert or oxidizing gas; (c) heating the reactor vessel to raise the temperature within the reactor vessel to a selected elevated temperature; (d) introducing air into the reactor vessel and thereafter introducing hydrogen chloride into the reactor vessel to obtain a desired air-hydrogen chloride mix and thereby form an oxidizing and chloridizing atmosphere which provides a protective oxide coating on the surface of the solid ferrous scrap metal in the mix and simultaneously oxidizes/chloridizes the copper in the mix to convert the copper to a copper monochloride gas for transport away from the solid ferrous scrap metal; and (e) collecting the copper monochloride gas for conversion to a recoverable copper species.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

Figure 1:
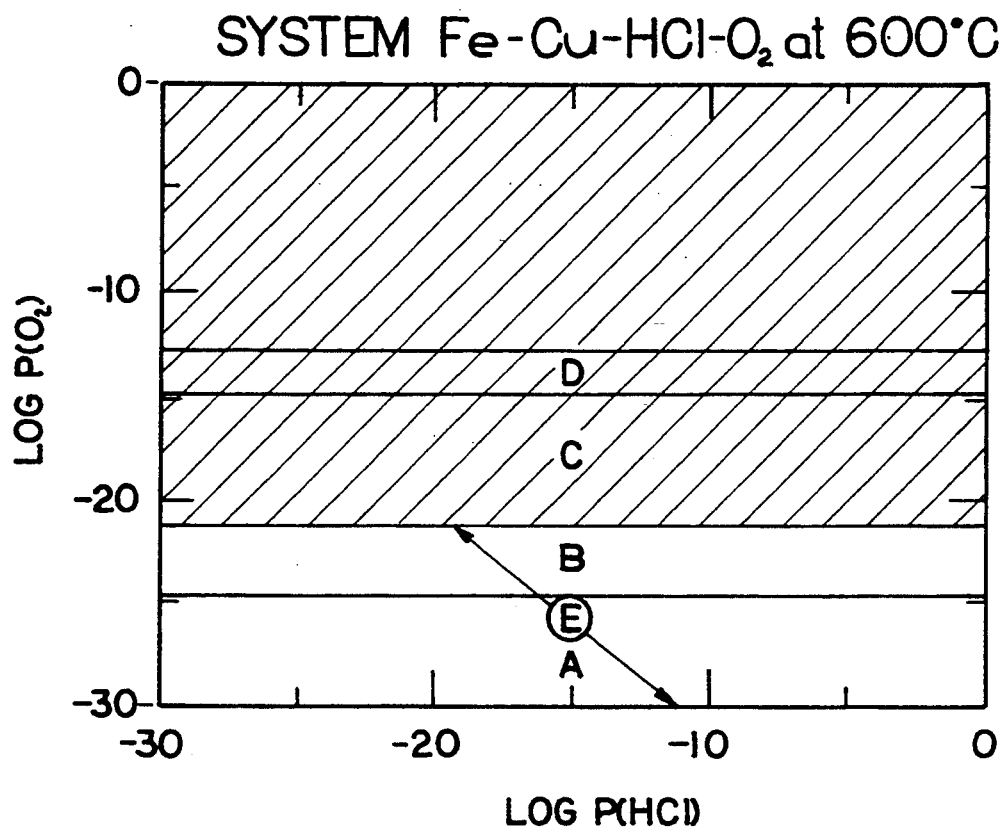
FIG. 1 is a predominance area diagram that shows the equilibrium stability and chemical species associations on a Fe—Cu—HCl—$O_2$ system at 600 degrees C., and further identifies the gas atmosphere compositions for the simultaneous oxidation of iron (Fe) and the chlorination of copper (Cu) at this temperature.

The present invention is directed to a process for removing copper in a recoverable form from a copper/solid ferrous scrap metal mix. Generally speaking, the process begins by placing a copper/solid ferrous scrap metal mix into a reactor vessel. The atmosphere within the reactor vessel is purged with an inert or oxidizing gas while the reactor vessel is heated in the area of the copper/solid ferrous scrap metal mix to raise the temperature within the reactor vessel to a selected elevated temperature. Air is introduced into the reactor vessel and thereafter hydrogen chloride is introduced into the reactor vessel to obtain a desired air-hydrogen chloride mix. The air-hydrogen chloride mix is operable to form an oxidizing and chloridizing atmosphere which provides a protective oxide coating on the surface of the solid ferrous scrap metal in the mix and simultaneously oxidizes/chloridizes the copper in the mix to convert the copper to a copper monochloride gas for transport away from the solid ferrous scrap metal. After the copper is completely removed from the copper/solid ferrous scrap metal mix, the flow of air and hydrogen chloride are stopped and the copper monochloride gas is collected for conversion to a recoverable copper species. Since the ferrous scrap metal is protected by an oxide coating, it is essentially unharmed from a metallurgical point of view by the chloridizing atmosphere within the reactor vessel. With the copper completely removed from the copper ferrous scrap metal mix, the ferrous scrap metal may be used as a steel making charge material without fear of contaminating the steel making process by tramp copper intermixed with the scrap metal.

The theory upon which the novel process identified above is based lies in the application of thermodynamics that favor the selective chlorination of copper in the presence of iron in an atmosphere containing air for the oxygen content and hydrogen chloride gas for chlorination. To establish the theoretical operating range for the process of the present invention, the change in Gibbs free energy values are calculated for the equations below:

| | CHANGE IN GIBBS FREE ENERGY VALUES (kcal/mol) | | |
|---|---|---|---|
| | | 600 deg C. | 927 deg C. |
| 1. | (a) $Fe(c) + \frac{1}{2}O_2(g) = FeO(c)$ | −51.334 | −46.459 |
| | (b) $3FeO(c) + \frac{1}{2}O_2(g) = Fe_3O_4(c)$ | −44.355 | −35.737 |
| | (c) $2Fe_3O_4(c) + \frac{1}{2}O_2(g) = 3Fe_2O_3(c)$ | −28.068 | −16.567 |
| 2. | (a) $2Cu(c) + \frac{1}{2}O_2(g) = Cu_2O(c)$ | −25.073 | −19.448 |
| | (b) $Cu(c) + HCl(g) = CuCl(c) + \frac{1}{2}H_2(g)$ | −03.507 | −01.408 |
| 3. | (a) $3/2Cu_2O(c) + 3HCl(g) = Cu_3Cl_3(g) + 3/2H_2O(g)$ | −20.089 | −19.855 |
| | (b) $Cu_2O(c) + 2HCl(g) = 2CuCl(c) + H_2O(g)$ | −29.634 | −26.737 |
| 4. | $FeO(c) + 2HCl(g) = FeCl_2(g) + H_2(g)$ | +07.924 | +05.380 |

| | CHANGE IN GIBBS FREE ENERGY VALUES (kcal/mol) | | |
|---|---|---|---|
| | | 600 deg C. | 927 deg C. |
| 5. | $Fe(c) + 2HCl(g) = FeCl_2(g) + H_2(g)$ | +04.283 | +02.290 |
| 6. | $3Cu(c) + 3HCl(g) = Cu_3Cl_3(g) + 3/2H_2(g)$ | +13.841 | +16.027 |

Figure 2:
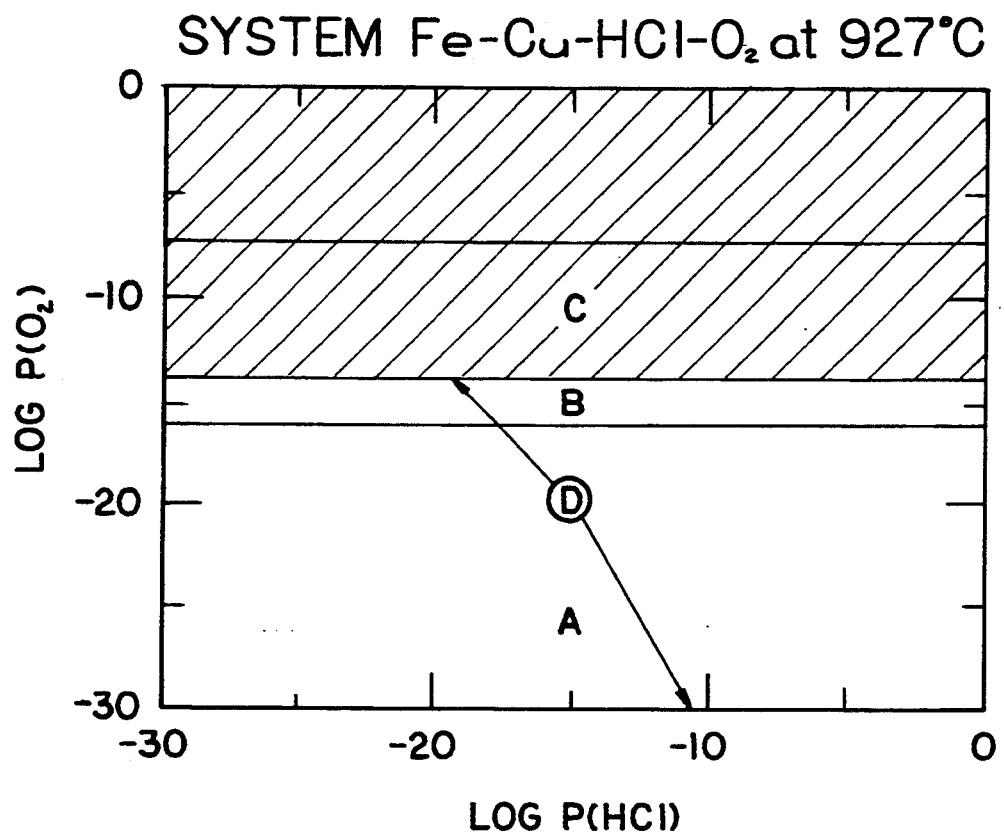
FIG. 2 is a predominance area diagram that shows the equilibrium stability and chemical species associations on a Fe—Cu—HCl—$O_2$ system at 927 degrees C., and further identifies the gas atmosphere compositions for the simultaneous oxidation of iron (Fe) and the chlorination of copper (Cu) at this temperature.

By utilizing the above equations and FIGS. 1 and 2, which represent the equilibrium stability and chemical species associations for the Fe—Cu—HCl—$O_2$ system at 600 degrees C. and 927 degrees, respectively, it can be seen that the process of the present invention consists mainly of the oxidation of iron (Eqs. 1(a) through 1(c) and the oxidation/chlorination of copper (Eqs. 2(a), (b), 3(a) and 3(b)). Equations (4), (5) and (6), which illustrate a positive change in Gibbs free energy values, indicate that the species on the left-hand side of the equations are favored. If the temperature falls below 600 degrees C., the undesirable production of $FeCl_2(g)$ is favored and if the temperature rises above 927 degrees C., this represents an unnecessary input of energy. Therefore, the preferred operating temperature range for the process of the present invention falls within a range of between 600 and 927 degrees C.

This preferred operating range between 600 and 927 degrees C. within an atmosphere comprised of air and hydrogen chloride gases at slightly above atmospheric pressure provides the oxygen and hydrogen chloride for the protective oxidation of iron within a copper/solid ferrous scrap metal mix and the oxidation/chlorination reactions required to remove copper in recoverable form from copper within the mix. The gas atmosphere composition range at 600 degrees C. includes $1 \times 10^{-21}$ atmospheres to 1 atmosphere for oxygen content and $1 \times 10^{-30}$ atmospheres to 1 atmosphere for HCl as shown in FIG. 1 by the diagonal lines. The gas atmosphere composition range at 927 degrees C. includes $1.5 \times 10^{-14}$ atmospheres to 1 atmosphere for oxygen content and $1 \times 10^{-30}$ atmospheres to 1 atmosphere for HCl as shown in FIG. 2 by the diagonal lines. For temperatures between 600 and 927 degrees C., the gas composition would fall between the two above condition boundaries. The oxidation of iron provides a protective layer on the iron surface which resists attack by hydrogen chloride while the copper is oxidized/chloridized by the air/hydrogen chloride. This oxidization/chloridization results in the generation of a volatile gas transport species trimeric copper monochloride ($Cu_3Cl_3$). This volatile gas transport species carries the copper away from the ferrous scrap metal in the copper/ferrous scrap metal mix. As the process continues the iron remains protected by an oxide coating while the copper continuously reacts with the air and HCl to form the volatile gas compound copper monochloride which flows away from the iron. An experimental apparatus operable to carry out the process of the present invention is illustrated in FIG. 3.

Figure 3:
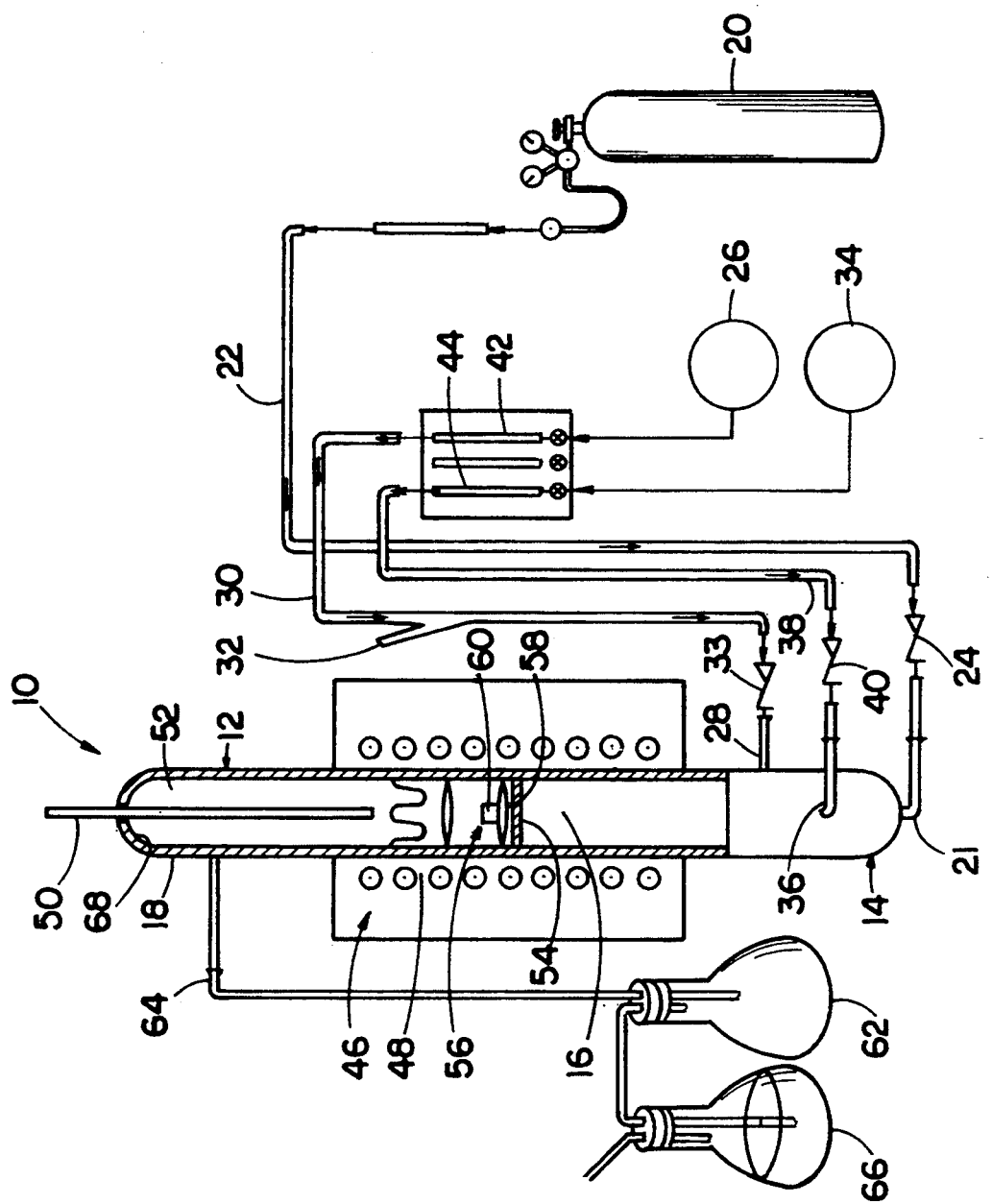
FIG. 3 is a schematic diagram illustrating an experimental reactor and auxiliary equipment used to implement the process of the present invention for removing copper in a recoverable form from a copper/solid ferrous scrap metal mix.

As seen in FIG. 3, the experimental apparatus is generally designated by the numeral 10 and includes a glass tube reactor vessel 12 having a gas inlet end portion 14, a center portion 16 and a gas outlet end portion 18. A hydrogen chloride source 20 is connected to the inlet end portion 14 of the reactor vessel 12 at inlet 21 via a gas line 22. The flow of hydrogen chloride gas into the inlet end portion 14 of the reactor vessel 12 is prevented from flowing backwards by a check valve 24. An air delivery source 26 is also connected to the gas inlet end portion 14 of the reactor vessel 12 at inlet 28 via an air line 30. The air line 30 includes a hygrometer port 32 to hold a hygrometer (not shown) to record the percent humidity which can be used to calculate the water vapor content of air entering the reactor vessel 12, if any. The air line 30 also includes a check valve 33 for preventing gas backflow from the reactor vessel 12. Finally, an inert gas delivery source 34 for delivering an inert gas such as argon is connected to the gas inlet end portion 14 of the reactor vessel 12 at inlet 36 via an argon gas line 38. The flow of inert gas into the gas inlet end portion 14 of the reactor vessel 12 also includes a check valve 40 to prevent gas backflow. Flowmeters 42 and 44 measure the amounts of air and inert gas, respectively, flowing into the gas inlet end portion 14 of the reactor vessel 12.

The one inch I.D. by 21 inch long glass reactor vessel 12 is positioned in a thirteen inch vertical electrical resistance tube furnace 46 so that the heat zone 48 of the furnace 46 surrounds the center portion 16 of the reactor vessel 12. The furnace 46 is capable of generating temperatures in its heat zone 48 required for implementing the process of the present invention (between 600 and 927 degrees C.). The furnace 46 is controlled by a conventional electronic controller (not shown) using a thermocouple 50 extending into the interior 52 of the reactor vessel 12.

The reactor vessel 12 has a glass support ridge 54 located at its center portion 16 to support a glass sample basket 56 having holes drilled in its bottom 58 to permit gas flow through both the support ridge 54 and the basket bottom 58. The basket 56 holds a test sample of a copper/solid ferrous scrap metal mix 60. The gas outlet end portion 18 of the reactor vessel 12 is connected with an empty flask 62 via a gas line 64. The empty flask 62 is used as a backflow preventer in front of a scrubber solution-containing flask 66. Gas exiting the outlet end portion 18 of the reactor vessel 12 flows through the gas line 64, through the empty flask 62 and into the flask 66 where a lime ($Ca(OH)_2$) scrubber solution neutralizes the gas before it exits the flask 66 and is collected in a fume hood (not shown) located directly above the flask 66.

To prove the concept of the process of the present invention, an experimental test sample 60 comprised of a 15.0 mg copper strand and a 1002.9 mg iron turning were intertwined and placed inside the sample basket 56. Calculations for the stoichiometric amounts of air and hydrogen chloride required to be delivered from the sources 26 and 20, respectively, were based on the Eqs. 1(a), 2(a) and 3(a) previously described, and the sample calculation is presented below:

Air requirements for oxidizing iron:
Basis:
1 g of Fe
30 minute test duration
Fe molecular weight (mw)=55.8
FeO molecular weight=71.8
$O_2$ molecular weight=32.0
$O_2$ density=1,429 g/l
(a) Percent of Fe in FeO=$mw_{Fe}/mw_{FeO} \times 100$=77.72%
(b) (0.7772)(g FeO)=1 g of Fe=1,287 g FeO
(c) Moles of FeO=1.287/71.8=0.017925 moles of FeO
(d) From Eq. 1(a), we know that for every ½ mole of $O_2$, we produce 1 mole of FeO, therefore (0.017925 moles FeO)(0.5 mole $O_2$/1 mole FeO)=0.008963 moles $O_2$
(e) g $O_2$ required=0.008963 moles $O_2$ (32 g/mole $O_2$)=0.2868 g $O_2$
(f) Volume of $O_2$=0.2868 g $O_2$ (1000 mL/1 L) (1 L $O_2$/1.429 g)=200.7 mL $O_2$
(g) 200.7 mL $O_2$/30 min=6.69 mL/min $O_2$ required
Therefore, the air (21% $O_2$) flowrate needed is:
(mL/min air) (0.21 $O_2$ in air)=6.69 mL/min $O_2$ air flow rate=31.86 mL/min This value is in excess of the amount of air needed because of the basis on complete conversion of the 1 g of Fe to FeO and the only requirement is that the surface of the iron be converted to a protective oxide coating. Similar calculations were completed for the air requirement for the oxidation of copper based on Eq. 2(a) and for the hydrogen chloride requirement for chlorination of copper based on Eq. 3(a).

The experimental was begun with the reactor vessel 12 loaded with the basket 56 containing the sample 60 of iron and copper. The reactor vessel 12 atmosphere was purged with the inert gas (argon) at 25.49 mL/min for approximately 31 minutes while the reactor vessel 12 temperature in the area of the basket 56 was brought up to 650 degrees C. Upon reaching 650 degrees C., the argon was turned off while air delivered from the air delivery source 26 was introduced into the interior 52 of reactor vessel 12 at 32.0 mL/min for approximately 2 minutes. Next, HCl gas delivered from the HCl source 20 was introduced into the interior 52 of the reactor vessel 12 at 5.09 mL/min with the air still flowing at the rate described immediately above to obtain a final atmosphere composition of 86.28% air and 13.72% HCl. The test duration was set for 30 minutes with the following significant event noted.

At approximately 10 minutes into the test there began an accumulation of a yellow/brown colored film deposit on the inside surface 68 of the reactor vessel gas outlet end portion 18. Depositing occurred as the inside surface 68 of the gas outlet end portion 18 was cool relative to the 650 degree C. temperature of the reactor vessel 12 at the area of furnace heat zone 48 (adjacent to the area of the sample 60). This deposited film continued to build up over the next 10 minutes at which time the reaction appeared to be completed. After the 30 minute test duration, the reaction gases of air and HCl were turned off and the reactor vessel 12 was again purged with argon at the 650 degree C. temperature for another 30 minutes. After this 30 minute purging, the reactor vessel temperature was brought down to room temperature while the argon continued to flow.

After the reactor vessel 12 was completely purged and brought to room temperature, it was opened and revealed that the copper was completely gone from the sample basket 56 while only the iron remained with a black coating. The only condensate buildup was, as described above, on the inside surface 68 of the reactor vessel 12 which was outside of the furnace heat zone 48. Analytical results confirmed that the copper was removed from the copper/ferrous scrap metal mix and deposited as a copper chloride species on the inside surface 68 of the reactor vessel 12 and that the iron remained as a solid in the furnace heat zone 48 covered with an oxide coating. The copper chloride species on the inside surface 68 of the reactor vessel 12 is capable of being removed and chemically treated to recover the copper.

It is thought that the present invention and many of its attendant advantages will be understood from the foregoing description and it will be apparent that various changes may be made in the form, construction and arrangement of the parts of the invention described herein without departing from the spirit and scope of the invention or sacrificing all of its material advantages, the form hereinbefore described being merely a preferred or exemplary embodiment thereof.

We claim:

1. A process for removing copper in a recoverable form from a copper/solid ferrous scrap metal mix, comprising the steps of:
   (a) placing a copper/solid ferrous scrap metal mix into a reactor vessel;
   (b) purging the atmosphere within said reactor vessel with an inert or oxidizing gas;
   (c) heating said reactor vessel to raise the temperature within said reactor vessel to a temperature within a range between 600 to 927 degrees C.;
   (d) introducing air into said reactor vessel and thereafter introducing hydrogen chloride into said reactor vessel to obtain a desired air-hydrogen chloride mix operable to form an oxidizing and chloridizing atmosphere which provides a protective oxide coating on the surface of the solid ferrous scrap metal in the mix and simultaneously oxidizes/chloridizes the copper in the mix to convert said copper to a copper monochloride gas for transport away from said solid ferrous scrap metal; and
   (e) collecting said copper monochloride gas for conversion to a recoverable copper species.

2. The process for removing copper in a recoverable form from a copper/solid ferrous scrap metal mix as recited in claim 1, wherein step (d) includes the substeps of:
   allowing air to flow into said reactor vessel for approximately two minutes before introducing hydrogen chloride into said reactor vessel; and
   controlling the amounts of air and hydrogen chloride introduced into said reactor vessel to obtain a desired air-hydrogen chloride mix of approximately 86.28% air and 13.72% hydrogen chloride.

3. The process for removing copper in a recoverable form from a copper/solid ferrous scrap metal mix as recited in claim 1, which includes heating only the portion of the reactor vessel adjacent to the copper/solid ferrous scrap metal mix so that the remainder of the reactor vessel remains cool relative to the heated portion to allow said copper monochloride gas transported away from said solid ferrous scrap metal to condense as a film in the cool portion of the reactor vessel.

4. The process for removing copper in a recoverable form from a copper/solid ferrous scrap metal mix as recited in claim 3, wherein said copper monochloride gas condenses as a film on an inside surface of said reactor vessel.

* * * * *